Dec. 26, 1967 J. N. RYPKEMA 3,360,608

SINGLE DIODE FM STEREO MULTIPLEX DETECTOR

Filed June 16, 1966

Inventor
Jouke N. Rypkema
By John J. Pederson
Attorney 3,360,608

SINGLE DIODE FM STEREO MULTIPLEX DETECTOR

Jouke N. Rypkema, Villa Park, Ill., assignor to Zenith Radio Corporation, Chicago, Ill., a corporation of Delaware Filed June 16, 1966, Ser. No. 558,081
10 Claims. (Cl. 179—15)

ABSTRACT OF THE DISCLOSURE

Monaural/stereophonic FM receiver has a first signal detector which derives the modulation of the received signal. Additionally, there is a series circuit having four leg portions, one of which is a single rectifying device and the other is a resistive load impedance. A switching signal is applied to that circuit to render the rectifier conductive and nonconductive at the switching frequency. In stereo reception, both the sum and difference modulation components derived in the first signal detector are injected into the series circuit and the two separated audio signals are derived at first and second output ports taken respectively across the aforesaid first and second legs of the series circuit.

Figures 1, 2:
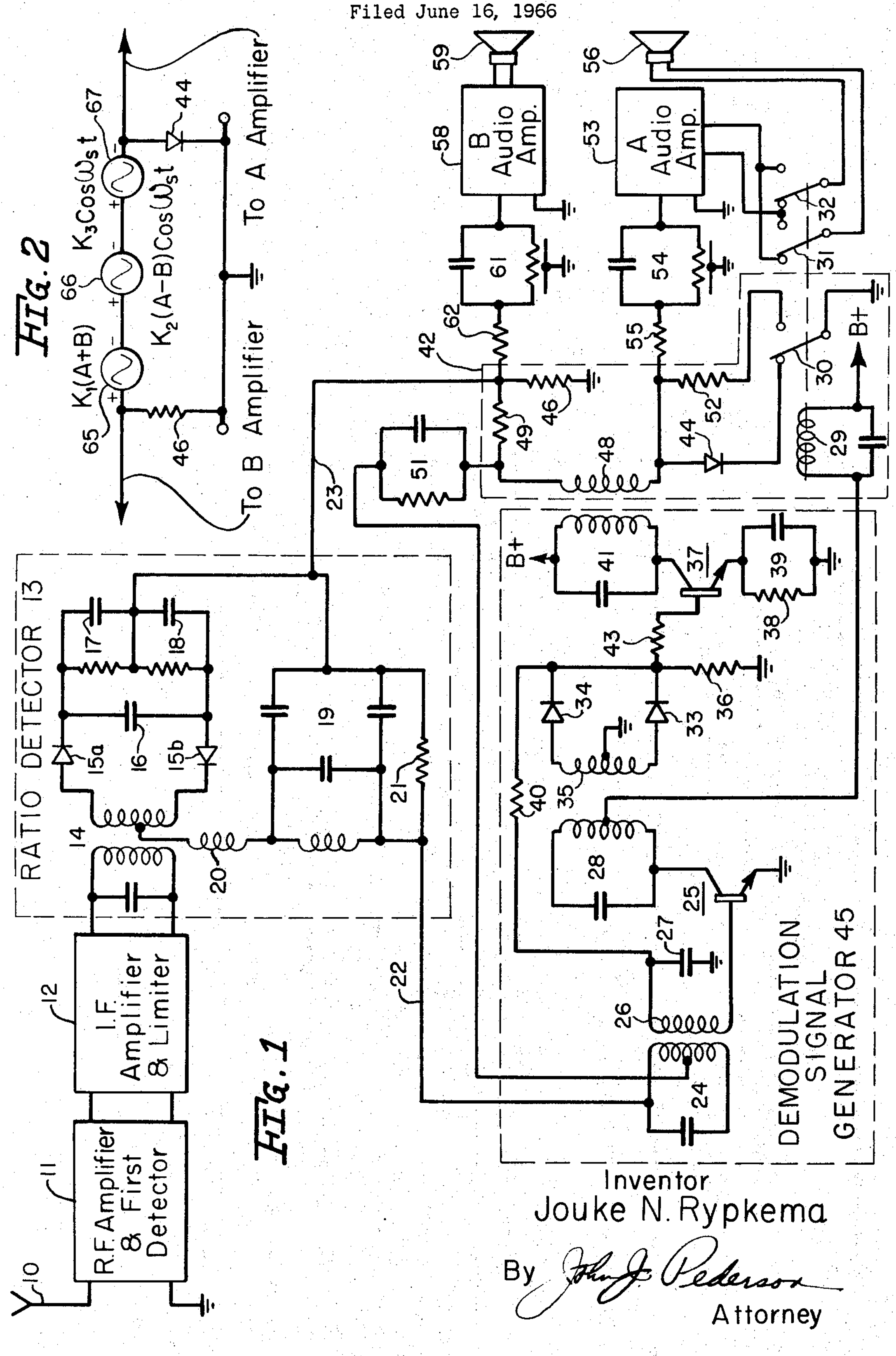

The present invention relates generally to radio receivers and detectors therefor and more particularly relates to a unique and highly simplified detector and receiver circuit having particular utility in stereophonic receivers. Although for convenience the invention will be described in the latter context, the more general utility of the circuit is to be understood.

In accordance with F.C.C. regulations for compatible monaural-stereo FM reception, the two channel program information of stereo is not transmitted in a form which is directly usable upon demodulation of the FM signal at the receiver. Rather the received signal is of a complex composition and must be further operated on in the receiver to derive the two distinct audio signals characteristic of stereo. Circuitry over and above that necessary for a conventional FM receiver is obviously required and as a result receivers equipped to reproduce stereo are considerably more expensive than monaural receivers. The amount and kind of additional apparatus necessary is, of course, dependent on which of the several well-known ways are employed to separate the elements of the complex signal. However, even one of the simpler methods requires a pair of diodes each with a resistor-capacitor load circuit. A circuit is known for accomplishing the above function with a single diode but even this circuit requires a pair of load circuits each including a resistor and capacitor. The present invention, on the other hand, contemplates derivation of separated stereophonic signals by use of only two circuit elements, an accomplishment heretofore not believed possible.

It is therefore an object of the present invention to provide a new and improved receiver responsive to the transmission of the sum and difference component type wherein one of these components is available at the receiver in a demodulated form and the other as modulation of a carrier.

It is further an object of the present invention to provide a new and improved stereo detector.

It is another object of the present invention to provide a highly simplified stereo demodulator circuit.

It is yet another object of the present invention to provide separated stereophonic signals at the outputs of a detector circuit having as its essential components only a single rectifying device and a single load impedance.

Accordingly, the present invention is directed to a demodulator for developing a pair of distinct signals from a received composite signal, such as a composite stereophonic signal, comprising a demodulated component and a subcarrier modulation component collectively defining the composition of the distinct signals. Specifically, the demodulator comprises a series circuit including a single rectifying device and comprising four leg portions with a first one of the leg portions including the single rectifying device and the second of the leg portions including a resistive load impedance. Also included are means for introducing both components of the composite signal into the series circuit with at least the demodulated component being applied in the third leg of the series circuit. First and second output ports are taken across the first and second legs of the series circuit, respectively, and separate signal utilization means are respectively coupled to the first and second output ports for developing each of the distinct signals separated from the other.

The features of this invention which are believed to be new are set forth with particularly in the appended claims. The invention, together with further objects and advantages thereof, may best be understood, however, by reference to the following description in conjunction with the accompanying drawings in which:

FIGURE 1 is a schematic representation of a compatible stereophonic-monophonic receiver embodying the present invention; and FIGURE 2 is a simplified schematic diagram useful in describing and understanding the operation of the stereo detector of the receiver of FIGURE 1.

The receiver of FIGURE 1 is designed to operate in response to either a monophonic program signal or a composite stereophonic program signal conforming to now standard specifications. Such a stereophonic transmission comprises a sum signal component, usually termed $(A+B)$, and a difference signal, $(A-B)$, the latter amplitude-modulated on a suppressed subcarrier signal. Since the transmission includes a suppressed subcarrier component, a pilot signal of a frequency equal to one-half that of the suppressed subcarrier, that is 19 kc., is also included and the three signal components thus defined are frequency modulated as a composite signal on a main carrier. Such a signal is intercepted by the illustrated receiver at a wave signal antenna 10. The circuits following antenna 10 and through the ratio detector are substantially conventional. They include a tunable radio frequency amplifier of any desired number of stages and a heterodyning stage or first detector, these being collectively represented by block 11. The output of block 11 connects with a unit 12 which will be understood to include any desired number of stages of intermediate frequency amplification and one or more amplitude limiters.

Following the IF amplifier and limiter 12 is a frequency modulation detector 13 which responds to an amplitude-limited intermediate frequency carrier signal to derive the frequency modulation components thereof. Since effective amplitude limiting is highly desirable in this receiver, it is convenient to follow the limiter of unit 12 with a ratio type FM detector as this device inherently performs an amplitude limiting function. Detector 13 is generally conventional in construction comprising a transformer 14 having a center-tapped secondary winding. The end terminals of the secondary winding are connected to a pair of oppositely poled diodes **15*a* and 15*b*, the diodes being shunted on their output side by a filter capacitor 16 and a pair of series connected resistor-capacitor load circuits 17, 18 for the diodes. A common midpoint of the load circuits is coupled to the center tap of the secondary winding of transformer 14 through an SCA filter 19 and a tertiary detector coil 20. The composite signal modulation of the received carrier wave is developed across a resistor 21 which is connected between the midpoint of diode loads 17, 18** and one terminal of an inductor of SCA filter 19. The composite signal information is available between a pair of output terminals 22, 23 which supply this signal to various portions of the receiver.

It is necessary for stereo reproduction to have a further demodulation of the subcarrier which conveys the difference information of the A and B audio signals. Since, as previously stated, the subcarrier is transmitted with no carrier component, the receiver has means responsive to the pilot signal of the received transmission for deriving a switching or demodulation signal having a fixed frequency and phase relation to the subcarrier. This means is located within the dashed outline labelled demodulation signal generator 45 in the drawing.

Generator 45 comprises a parallel resonant circuit 24 coupled to output terminal 22 of the ratio detector and tuned to the 19 kc. pilot frequency. A pilot signal amplifier transistor 25 of the NPN type has a base electrode connected to one terminal of an inductor 26 which is in turn inductively coupled to parallel resonant circuit 24. Inductor 26 is returned to ground by a filter capacitor 27. An emitter electrode of amplifier 25 is grounded while its collector electrode is coupled to a B+ voltage supply through a second pilot resonant circuit 28 and a relay coil 29 shunted by a capacitor. The function of this relay will be explained hereafter; it is sufficient for the present to note that energization of coil 29 concurrently operates three relay armatures 30, 31 and 32 as denoted by the dashed line interconnecting them in the drawing and that the coil is shown in its energized condition.

Tuned amplifier 25 drives a frequency doubler comprising a pair of semiconductor diodes 33, 34 connected across the opposite terminals of a coil 35 having a center tap returned to ground. Coil 35 is inductively coupled to resonant circuit 28. The junction of diodes 33, 34 is returned to ground through a diode load resistor 36. The circuit of diodes 33, 34 is similar to a full-wave rectifier; a connection from the junction of these diodes to the base of amplifier 25 through an A.C. filter comprising a series resistor 40 and shunt capacitor 27 constitutes a D.C. regenerative feedback connection for this amplifier. Since the demodulation signal generator 45 is normally biased to cut-off to provide desired noise immunity during monaural reception, the regenerative feedback afforded by the positive D.C. bias available at the output of the frequency doubler is required to increase the sensitivity and gain of the amplifier to an appropriate level in the presence of a pilot signal having an amplitude exceeding a given threshold level.

Frequency doubler diodes 33, 34 are also coupled to the base electrode of another tuned transistor amplifier 37 of the NPN variety through a series resistor 43. The emitter of this transistor is returned to ground through a resistor 38 and a bypass capacitor 39 while the collector is coupled to a B+ bias supply through a resonant circuit 41 that is tuned to the demodulation or switching signal frequency. Resonant circuit 41 is inductively coupled to a demodulator circuit of the present invention which is shown enclosed within dashed outline 42. Tuned circuit 41 operates to apply the required switching signal to the demodulator as will be more fully explained hereafter.

Demodulator 42 comprises a series circuit including a single rectifying device 44. Specifically, the circuit consists of four leg portions with a first one of the leg portions including diode 44 and a second of the leg portions including a resistive load impedance 46. A third leg includes a series connected inductor 48 and a resistor 49. Coil 48 is inductively coupled to resonant circuit 41 and thereby serves as means for introducing a switching signal into the series circuit for rendering diode 44 conductive and nonconductive in alternation at a frequency corresponding to the subcarrier signal. The information containing components of the composite stereo signal are introduced into the series demodulator circuit by resistor 49. The signal components are applied to this resistor by a series path extending from ratio detector terminal 22 through parallel resonant circuit 24 and a resistor-capacitor pre-emphasis network 51 to the remaining terminal 23 of the ratio detector. Although the entire composite signal is illustrated as being introduced into the third leg of the series circuit, this is not essential, but for reasons that will become apparent hereinafter, it is only necessary that the sum signal component be introduced at this point. The remaining or fourth leg of the circuit is indicated by the common ground between diode 44 and resistor 46. Finally, the illustrated demodulator is provided with a resistor 52 having one terminal coupled to the anode of diode 44 and having an impedance approximating that of load resistor 46. As is clear from the drawing, resistor 52 and diode 44 are alternatively coupled into or removed from the series circuit, with diode 44 being coupled to ground through movable armature 30 during stereo reception and resistor 52 being connected to ground during monaural reception.

First and second output ports are taken across the first and second legs of the series circuit respectively, that is, diode 44 and resistor 46. Specifically, an A audio amplifier 53 is coupled across diode 44 through a conventional de-emphasis network 54 and series resistor 55. Amplifier 53 is provided with two output terminals each of which is connected to a pair of common contacts with one contact of each common pair being connected to a respective terminal of a loudspeaker 56 through relay armatures 31 and 32. Movement of armatures 31 and 32 to their respective alternate positions reverses the speaker terminals with respect to the amplifier. Similarly, a B audio amplifier and loudspeakers 58 and 59 are coupled across load resistor 46 by a de-emphasis network 61 and a series resistor 62. Loudspeakers 56 and 59 are, of course, spacially arranged to achieve a pattern of stereophonic sound reproduction in the area served by the receiver.

The operation of the circuit of the present invention will first be briefly explained with reference to FIGURE 1 and on the assumption that a stereophonic program signal is being received. In this case, a 19 kc. pilot tone is developed across resonant circuit 24 and is applied to the base of amplifier transistor 25 by inductor 26. Conduction of transistor 25 energizes relay coil 29 resulting in its armatures 30, 31 and 32 being positioned as depicted in the drawing. Conduction of this transistor also drives frequency doubler diodes 33, 34. The DC component developed at the output sides of these diodes serves to bias both transistors 25 and 37 to a more highly conductive quiescent condition while the second harmonic of the pilot tone present in the rectified signal is selected by tuned collector circuit 41 of transistor 37 and is introduced into the series demodulator circuit across inductive coil 48. The subcarrier switching signal so applied to the series circuit serves to alternately render diode 44 conductive and nonconductive at the switching signal frequency. The modulated subcarrier information is introduced into the series circuit across load resistor 49 and by virtue of the switching action effected on diode 44 appears as demodulated audio information of the same phase across both resistor 46 and diode 44. The sum signal component of the composite stereo signal is likewise introduced into the series circuit across load resistor 49, but is first reduced in amplitude with respect to the modulated subcarrier component by pre-emphasis network 51 in order to effect proper matrixing and separation of the stereo signals, as is well understood in the art. By virtue of the construction of the series circuit, the sum signal is developed in like phase to the difference signal component across load resistor 46 and in a negative or opposite phase thereto across diode 44. Matrixing of the respective components provides substantially a "—A" audio signal across load resistor 46 which is ultimately reproduced by loudspeaker 59 and a "B" audio signal across diode 44. The phase of the A signal is corrected by connection of loudspeaker 56 to amplifier 53 in a phase opposite sense from the manner in which B audio amplifier 58 is coupled to loudspeaker 59.

Assuming now reception of a monaural signal, a pilot tone is not present across circuit 24 and consequently demodulation signal generator 45 is inoperative. Accordingly, relay coil 29 is de-energized so that its armatures 30, 31 and 32 engage the respective open contact illustrated in the drawing. The demodulated monaural audio information applied to the series circuit across resistor 49 is developed in like amplitude and phase across load resistors 46 and 52. Since, as stated, the phase of the audio signals applied to the respective reproducers is the same, armatures 31 and 32 now connect the A audio amplifier to its reproducer in the same polarity as the B audio amplifier is connected to its loudspeaker.

An analytical understanding of the inventive circuit may be had by reference to the simplified schematic representation in FIGURE 2 wherein the information components of the composite stereo signal and the demodulation signal are shown as being applied to the circuit by three separate and ideal voltage generators 65, 66 and 67. Looking into the demodulator from the A amplifier port and assuming the instantaneous polarities of the generators to be those indicated by the "plus" and "minus" signs in the drawing, diode 44 is nonconductive and the sum of voltage generators 65, 66 and 67 appears across the output terminals. On the opposite half-cycle of voltage generator 67, diode 44 is conductive and the output terminals are short-circuited. Thus, at the A amplifier an average output signal, $V_a$, is derived which is the product of a 1–0 switching function, effected by conduction and nonconduction of diode 44, and the voltage waveforms of generators 65, 66 and 67. Assuming $$K_1=\frac{2}{\pi}$$

$K_2=1$ and $K_3$ substantially greater than unity as is preferred for proper switching of the diode and only writing the relevant terms of the switching function, this may be mathematically represented as follows:

$$V_a=\left(\frac{1}{2}+\frac{2}{\pi}\cos\omega_s t+---\right)\left[-\frac{2}{\pi}(A+B)-(A-B\cos\omega_s t-K_3\cos\omega_s t\right]$$

Ignoring superaudible components which are substantially bypassed by de-emphasis network 54, the above reduces to:

$$V_a=\left(\frac{1}{2}\right)\left(-\frac{2}{\pi}\right)(A+B)-\left(\frac{2}{\pi}\right)\left(\frac{1}{2}\right)(A-B)$$

$$V_a=\left(-\frac{1}{\pi}-\frac{1}{\pi}\right)A+\left(-\frac{1}{\pi}+\frac{1}{\pi}\right)B$$

$$V_a=-\frac{2}{\pi}A$$

To now consider the demodulator as viewed from the B amplifier port, conduction of diode 44 develops the sum of the voltages of the three generators across load resistor 46 while during nonconduction of the diode an open circuit is seen. Thus, the average voltage appearing across load resistor 46, $V_b$, is effectively the product of the voltage waveforms of the three generators and a 0–1 switching function. Assuming the same value for the constants listed above and considering only the relevant terms of the switching function, this may be mathematically written as follows:

$$V_b=\left(\frac{1}{2}-\frac{2}{\pi}\cos\omega_s t+---\right)\left[+\frac{2}{\pi}(A+B)+(A-B)\cos\omega_s t+K_3\cos\omega_s t\right]$$

Again ignoring superaudible components which are bypassed by de-emphasis network 61, the above reduces to:

$$V_b=\left(\frac{1}{2}\right)\left(\frac{2}{\pi}\right)(A+B)-\left(\frac{1}{2}\right)\left(\frac{2}{\pi}\right)(A-B)$$

$$V_b=\left(\frac{1}{\pi}-\frac{1}{\pi}\right)A+\left(\frac{1}{\pi}-\frac{1}{\pi}\right)B$$

$$V_b=\frac{2}{\pi}B$$

The demodulator thus described is an ultimate in simplicity requiring only a single diode and single load resistor to develop separated stereo information from an applied composite stereo signal. The economy attendant such an arrangement is obvious. As will also be readily apparent to those skilled in the art, generators 66 and 67 may be located in any of the four legs of the series circuit as these generators develop superaudible signals which are not discernible in the reproduction. On the other hand, sum signal generator 62 is preferably located in the third branch of the series circuit as illustrated and preferably is applied to the circuit as a "floating" electrical source, that is, neither of the output terminals of the source is fixedly established at a reference potential. Further, it is apparent that the circuit is not limited to reception of stereophonic signals, but also may be used effectively to develop distinct output signals from any sum and difference transmission wherein either the sum or difference component is present in a demodulated form while the remaining component is present as modulation on a carrier at some point in the receiver.

While a particular embodiment of the invention has been shown and described, modifications may be made, and it is intended in the appended claims to cover all such modifications as may fall within the true spirit and scope of the invention.

I claim:

1. A demodulator for developing a pair of distinct signals from a received composite signal comprising a demodulated component and a subcarrier modulation component collectively defining the composition of said distinct signals, said demodulator comprising:

a series circuit including a single rectifying device and comprising four leg portions with a first one of said leg portions including said single rectifying device and a second of said leg portions including a resistive load impedance;

means for introducing both components of said composite signal into said series circuit with at least said demodulated component being applied in said third leg of said series circuit;

a first output port taken across said first leg portion;

a second output port taken across said second leg portion;

and separate signal utilization means respectively coupled to said first and second output ports for developing each of said distinct signals separated from the other.

2. The combination according to claim 1 and further including means for maintaining said fourth leg portion of said series circuit at a reference potential.

3. The combination according to claim 2 wherein one of said demodulation and modulation components comprises the sum of said distinct signals and the other comprises the difference of said distinct signals.

4. A receiver for using a stereophonic transmission comprising a carrier signal frequency modulated in accordance with the sum of two audio signals and also in accordance with a subcarrier signal which has been suppressed-carrier amplitude-modulated with the difference of said two audio signals, said receiver comprising:

a frequency modulation detector responsive to said modulated carrier for deriving a composite signal representing the modulation of said carrier;

a series circuit including a single rectifying device and comprising four leg portions with a first one of said leg portions including said single rectifying device and a second of said leg portions including a resistive load impedance;

means for introducing a switching signal into said series circuit for rendering said single rectifying device conductive and nonconductive in alternation at a frequency corresponding to said subcarrier signal;

signal source means for introducing both components of said composite signal into said series circuit with at least said sum signal portion being applied in a third leg of said series circuit;

a first output port taken across said first leg of said series circuit;

a second output port taken across said second leg of said series circuit;

and separate amplifying and reproducing means respectively coupled to said first and second output ports for developing each of said two audio signals separated from the other.

5. The combination according to claim 4 and further including means for maintaining said fourth leg of said series circuit at a reference potential.

6. The combination according to claim 5 in which said sum signal is applied as an electrically floating source in said fourth leg of said series circuit.

7. The combination according to claim 6 in which said first leg of said series circuit consists of only said single rectifying device and said second leg consists of only said resistive load impedance.

8. The combination according to claim 7 in which said signal source means includes means for emphasizing said modulated subcarrier signal with respect to said audio sum signal.

9. The combination according to claim 8 and further including automatic mode changing means for coupling a load resistor in shunt with said single rectifying device only in the absence of said switching signal.

10. The combination according to claim 9 and further including means operative with said automatic mode changing means for reversing the phase of one of said developed audio signals.

References Cited

UNITED STATES PATENTS 3,154,641 10/1964 Dietch -------------- 179—155

ROBERT L. GRIFFIN, *Primary Examiner.*